United States Patent
Ghidotti Piovan et al.

(10) Patent No.: US 10,275,874 B2
(45) Date of Patent: Apr. 30, 2019

(54) METHOD AND APPARATUS FOR DETECTING DEFECTS ON THE SURFACE OF TYRES

(71) Applicant: PIRELLI TYRE S.p.A., Milan (IT)

(72) Inventors: Alessandro Ghidotti Piovan, Imola (IT); Valeriano Ballardini, Imola (IT); Vincenzo Boffa, Milan (IT); Fabio Regoli, Milan (IT); Luigi Di Stefano, Bologna (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 15/737,088

(22) PCT Filed: Jun. 21, 2016

(86) PCT No.: PCT/IB2016/053680
§ 371 (c)(1),
(2) Date: Dec. 15, 2017

(87) PCT Pub. No.: WO2017/001970
PCT Pub. Date: Jan. 5, 2017

(65) Prior Publication Data
US 2018/0189939 A1    Jul. 5, 2018

(30) Foreign Application Priority Data

Jun. 30, 2015    (IT) .................. 102015000028956

(51) Int. Cl.
*G06T 7/00* (2017.01)
*G01M 17/02* (2006.01)
(Continued)

(52) U.S. Cl.
CPC ........... *G06T 7/001* (2013.01); *G01M 17/027* (2013.01); *G06K 9/2027* (2013.01);
(Continued)

(58) Field of Classification Search
CPC ......... G06T 7/001; G06T 2207/20192; G01M 17/027; B29D 30/00
See application file for complete search history.

(56) References Cited

U.S. PATENT DOCUMENTS

| 2004/0131256 A1 | 7/2004 | Fujieda et al. |
| 2011/0013823 A1 | 1/2011 | Joly |

(Continued)

FOREIGN PATENT DOCUMENTS

| JP | 2010-32467 | 2/2010 |
| WO | WO 2013/045594 A1 | 4/2013 |
| WO | WO 2017/001969 A1 | 1/2017 |

OTHER PUBLICATIONS

International Search Report form the European Patent Office in corresponding international Application No. PCT/IB2016/053580 filed Oct. 11, 2016.

(Continued)

*Primary Examiner* — Ruiping Li
(74) *Attorney, Agent, or Firm* — Finnegan, Henderson, Farabow, Garrett & Dunner, L.L.P.

(57) ABSTRACT

Method and related apparatus for detecting defects on a surface of a tire, include: providing the tire; acquiring a digital image including a structure including sections representative of linear elements of a pattern in a surface portion and representative of possible elongated defects, the sections of the structure having a respective orientation; providing a model of the pattern in the surface portion, wherein each pixel is associated with a first index representative of whether the pixel belongs or not to a pattern section and a second index representative of an at least local orientation of the pattern section passing through the pixel; calculating for each pixel of the structure a third index representative of the orientation of the structure section passing through the pixel; and establishing, for each pixel of (Continued)

the structure having a corresponding pixel in the pattern model belonging to the pattern, whether the pixel of the structure belongs to a proposed defect on the basis of the comparison between the third index and the second index associated with the corresponding pixel in the pattern model.

13 Claims, 16 Drawing Sheets

(51) Int. Cl.
*G06T 7/12* (2017.01)
*G06T 7/136* (2017.01)
*G06K 9/20* (2006.01)
*G06K 9/62* (2006.01)

(52) U.S. Cl.
CPC ......... *G06K 9/2036* (2013.01); *G06K 9/6214* (2013.01); *G06T 7/12* (2017.01); *G06T 7/136* (2017.01); *G06T 2207/20021* (2013.01); *G06T 2207/20216* (2013.01); *G06T 2207/20224* (2013.01); *G06T 2207/30164* (2013.01)

(56) References Cited

U.S. PATENT DOCUMENTS

| | | | |
|---|---|---|---|
| 2014/0283591 A1* | 9/2014 | Takahashi | G01B 11/245 73/146 |
| 2016/0263952 A1* | 9/2016 | Mizutani | B60C 19/00 |
| 2016/0307313 A1* | 10/2016 | Tada | B60C 99/00 |

OTHER PUBLICATIONS

Written Opinion of the International Searching Authority from the European Patent Office in corresponding International Application No. PCT/IB2015/053680, dated Oct. 11, 2016.

* cited by examiner

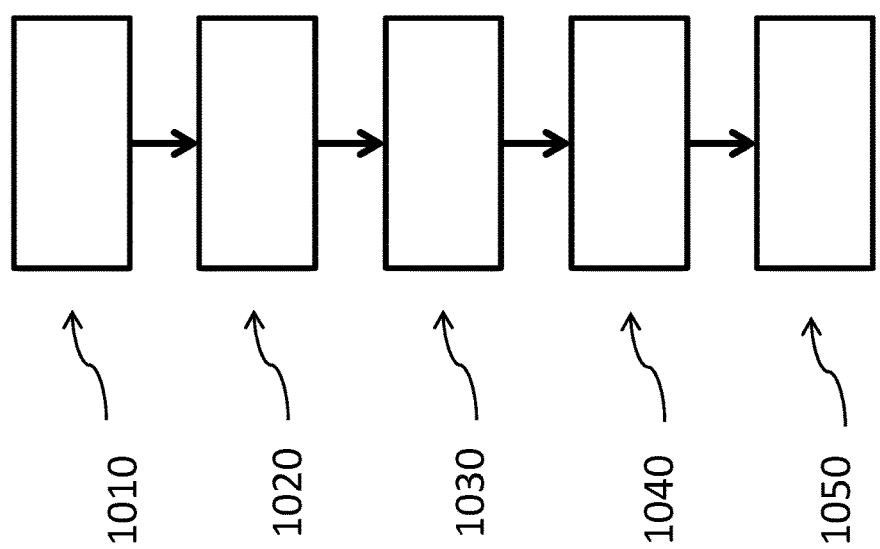

METHOD AND APPARATUS FOR DETECTING DEFECTS ON THE SURFACE OF TYRES

CROSS REFERENCE TO RELATED APPLICATIONS

This application is a national phase application based on PCT/IB2016/053680, filed Jun. 21, 2016, and claims the priority of Italian Patent Application No. 102015000028956, filed Jun. 30, 2015, the content of each application being incorporated herein by reference.

BACKGROUND OF THE INVENTION

Field of the Invention

The present invention relates to a method and an apparatus for detecting the possible presence of defects on the surface of a tyre, where the surface has a pattern comprising, or consisting of, a plurality of sections.

Description of the Related Art

By the term 'defect' it is meant any deviation from a desired condition, irrespective of the fact that such deviation gives rise to a degradation of the performance of the tyre (which can thus be discarded or downgraded) or consists of a simple anomaly (e.g. aesthetic) that does not cause the tyre to be discarded or downgraded. The defects may for example be portions with non-vulcanised compound, alterations in shape, cuts, creeps in the carcass, presence of foreign bodies on the surface, etc.

By "tyre" it is meant the finished tyre, that is, after the moulding and vulcanisation steps. Once the green tyre has been prepared, a moulding and vulcanisation treatment is typically carried out in order to determine the structural stabilisation of the tyre through cross-linking of the elastomeric compositions as well as to impart a desired tread pattern thereon and any distinguishing or information graphic signs at the sidewalls.

According to a typical method, during the moulding and vulcanisation step, a suitable bladder (typically of an elastomeric compound) is inserted inside the tyre and made to expand (e.g. pneumatically) against the inner surface of the same, in order to push the tyre against the outer mould and ensure the proper adhesion thereof to the same. This bladder is typically externally grooved with a pattern of grooves in order to facilitate the local mutual sliding thereof between the inner surface of the tyre and the outer surface of the bladder during vulcanisation and moulding. Such a pattern can facilitate the outflow of air trapped between the bladder and the tyre and/or facilitate the detachment between the bladder and the tyre at the end of the moulding and vulcanisation. Therefore the inner surface of the tyre has a corresponding "pattern", typically in relief. Typically, the pattern comprises a series of rectilinear and parallel spans typically distributed with substantial periodicity along the circumferential direction, and/or a dense network of contiguous geometric shapes (in the jargon called 'pebble edge').

In the present description and claims, by 'pattern' it is more generally meant a set of linear elements arranged on the inner or outer surface of a tyre, such linear elements being generated during the moulding and vulcanisation step of the tyre and being typically in relief, but being able to also be in low relief or simply two-dimensional, i.e. at the same elevation level as the rest of the surface. For example, the tread grooves fall within the definition of pattern. Such surface linear elements are typically rectilinear segments interconnected in a continuous network, but can more generally have any shape and/or surface distribution. Such surface linear elements typically cause a colour change and/or reflectivity/diffusivity of an incident light compared to the rest of the surface.

Typically, a tyre for vehicle wheels has a substantially toroidal structure around an axis of symmetry coinciding with the axis of rotation of the same during operation, and has an axial middle line plane orthogonal to the axis of symmetry, said plane typically being a geometrical (substantial) symmetry plane (ignoring any minor asymmetries, such as tread pattern and/or parts of the inner structure).

By "inner surface" of the tyre it is meant the surface extending inside said toroidal structure from one to the other bead (in other words, the surface no longer visible after the coupling of the tyre with the respective mounting rim).

The inner surface typically belongs to a layer of elastomeric material, usually called "liner", having optimal air impermeability characteristics. Certain defects on the inner surface, such as cuts, open joints, creeps, etc., may impair the air impermeability of the tyre.

In the context of the production processes of tyres for vehicle wheels, the need has been felt to perform quality inspections on finished products, with the aim to prevent defective tyres from being put on the market, and/or to progressively adjust the apparatuses and machinery used so as to improve and optimise the execution of the operations carried out in the production process.

These quality inspections include for example those performed by human operators who dedicate a fixed time to a visual and tactile inspection of the tyre; if, in the light of his own experience and sensitivity, the operator were to suspect that the tyre does not meet certain quality standards, the same tyre is subjected to further inspections, through a more detailed human inspection and/or suitable equipment in order to deepen the evaluation of any structural and/or qualitative deficiencies.

Document WO2013/045594A1 describes a quick method of analysis of the elements in relief on the inner surface of a tyre, comprising the steps of: capturing a three-dimensional image of the surface assigning a grey level value to each pixel of the image proportional to the topographical elevation of that point to obtain a starting image, transforming the captured image in an orthogonal reference system (OXY) in which the abscissa axis (OX) represents the circumferential values, and the ordinate axis (OY) the radial values, assigning a value of the altitude gradient (f(p)) to each pixel on the surface, comparing its elevation with the elevation of a discrete and small number of points arranged on a straight line passing through the respective pixels (p) and oriented in the circumferential direction.

In the field of tyre quality control, the Applicant has set itself the problem of detecting the possible presence of defects on the surface of a tyre by the optical acquisition of digital images and subsequent processing thereof. The Applicant has observed for the quality control to be used "in line" in a plant for the production of tyres, it is necessary that the inspections itself is performed in a reduced time and with reduced costs. In this context, the computational requirement of the processing algorithms plays a crucial role, since when it is excessive, the control times increase unacceptably and/or the computational capacity required makes the control unfeasible.

By "digital image", or equivalently "image", it is generally meant a set of data, typically contained in a computer file, in which each tuple of coordinates (typically each pair of coordinates) of a finite set (typically two-dimensional and matrix, i.e. N rows×M columns) of tuples of spatial coordinates (each tuple corresponding to a pixel) is associated with a corresponding set of numerical values (which may be representative of different magnitudes). For example, in monochrome images (such as those in grey levels or 'greyscale'), such a set of values consists of a single value in a finite scale (typically 256 levels or tones), this value for example being representative of the luminosity (or intensity) level of the respective tuple of spatial coordinates when displayed. A further example is represented by colour images, in which the set of values represents the luminosity level of a plurality of colours or channels, typically the primary colours (for example red, green and blue in RGB coding and cyan, magenta, yellow and black in CMYK coding). The term 'image' does not necessarily imply the actual display of the same.

In the present description and claims, the term 'image' encompasses both the three-dimensional images, in which each pixel is associated with a surface altitude information (such as the images obtained with laser triangulation), and two-dimensional images, in which each pixel is associated with information representative of the colour and/or reflectivity/diffusivity of the respective point of the surface, such as the images detected by the common digital cameras or video cameras (e.g. CCD).

By 'point of the surface' it is meant a surface portion having a small (not zero) extension compatible with the size of a pixel of an acquired image of the surface.

In the present description and claims, any reference to a specific "digital image" (for example, the two-dimensional digital image initially acquired on the tyre) includes more generally any digital image obtainable through one or more digital processing of said specific digital image (such as, for example, filtering, equalization, smoothing, finalisation, thresholding, morphological transformations (opening, etc.), derivative or integral calculations, etc.).

SUMMARY OF THE INVENTION

The Applicant has noted that the presence of the pattern on the tyre surface disturbs the image and/or its processing, in tyre quality control, since it tends to hide or mask the defects.

This the more so when the defect, for example a cut, intersects one or more sections of the pattern, since in the intersection area it is difficult to distinguish, by numerical processing, a pattern section from a defect, in particular if it also is elongated.

The Applicant, in the context of quality control of tyres (in particular for the detection of defects on the surface of tyres) based on the acquisition and processing of digital images in an industrial tyre production line, with reduced computational costs and requirements, reliable in the result obtained and also with a high degree of sensitivity in the detection of defects, in particular being capable of detecting surface defects even in the presence of a surface pattern, has therefore considered the problem of developing a method and an apparatus for detecting defects on the surface of tyres able to distinguish any elongated surface defects that intersect with the sections of a pattern present on the surface, from the sections themselves.

The Applicant has solved the above problem by the method and apparatus of the present invention that use the difference in the respective orientation of the elongated defects and of the pattern sections.

In a first aspect thereof, the invention relates to a method for detecting defects on a surface of a tyre, the method comprising:
  providing the tyre having said surface which has a pattern comprising, or consisting of, a set of linear elements;
  acquiring at least one digital image of a portion of the surface, said digital image comprising a structure comprising sections representative of said linear elements of the pattern in said surface portion and representative of possible elongated defects, said sections of said structure having, at least locally, a respective orientation;
  providing a digital model of the pattern in said surface portion, wherein each pixel is associated with a first index representative of whether the pixel belongs to a pattern section in said model and, for the pixels belonging to the pattern in said model, a second index representative of an at least local orientation of said pattern section in said model passing through said pixel;
  calculating, for each pixel of said structure, a third index representative of the orientation of the structure section passing through said pixel;
  for each pixel of the structure having a corresponding pixel in the pattern model belonging to the pattern, comparing said third index with said second index associated with said corresponding pixel in the pattern model,
  on the basis of said comparison, establishing if said pixel of the structure belongs to a proposed defect.

According to the Applicant the above method, due in particular to the identification of the pixel structure that are superimposed to the pattern in the pattern model (by means of the first index) and, for each of these pixels, due to the comparison between the respective orientation of the structure section passing by the pixel (expressed by the third index) with the respective orientation of a corresponding pattern section in the pattern model passing by the corresponding pixel of the pattern model (expressed by the second index), allows detecting any defect sections with an elongated shape that intersect, thereby superimposing on, the pattern sections in the pattern model, on the basis of the fact that the orientation of these defect sections is typically different from the orientation of the intersected pattern section in the pattern model. For example, the above method allows distinguishing the structure sections superimposed to the pattern in the pattern model and which are representative of the pattern in said at least one digital image (since they have substantially the same orientation as the corresponding pattern sections in the pattern model) from the structure sections superimposed to the pattern in the pattern model and which are representative of elongated defects (since they have an orientation substantially different from the section pattern that intersects it in the pattern model).

Preferably, said first index representative of whether the pixel belongs or not to a pattern section in said pattern model is binary.

Preferably, it is contemplated to identify a first set of pixels of said at least one digital image that belong to said structure and whose corresponding pixels in the pattern model do not belong to the pattern. Advantageously, in this way, the possible defects located outside of the pattern, i.e. belonging to the 'background' of the pattern, are identified.

Preferably, it is contemplated to identify a second set of pixels comprising said possible defects.

Preferably, it is contemplated to create a final image representative of said surface portion wherein the pixels corresponding to said first and second set of pixels are discriminated from the remaining pixels.

Typically, acquiring said at least one digital image comprises acquiring a first digital image each pixel of which is associated with a luminosity value representative of the reflectivity and/or diffusivity and/or colour of a surface point corresponding to said each pixel. Preferably, said point on the surface is illuminated with diffused light.

In a first embodiment, calculating said third index representative of the orientation of the structure section passing through the pixel comprises calculating a gradient in said pixel, said gradient being characterized by a modulus and an orientation in said digital image. Typically, the gradient orientation is representative of the angle formed by the gradient vector with respect to a reference direction. Preferably, the orientation is normalized in a range of 180°.

Typically, said gradient is a vector with two components representative of a variation of said luminosity values along two coordinates (typically orthogonal to each other), respectively.

The term 'gradient' in the present application is used in a general sense to indicate the variation of the luminosity values along the two coordinates, and not necessarily with reference to the differential calculation.

Preferably, said third index is representative of said gradient orientation.

In a second embodiment, calculating said third index representative of the orientation of the structure section passing by the pixel includes calculating at least one eigenvector of a Hessian matrix in the pixel.

Preferably, said third index is representative of an orientation of said at least one eigenvector.

Preferably, said at least one eigenvector is the principal eigenvector of the Hessian matrix. Preferably, said pattern model contains a dilated pattern with respect to said pattern in said at least one digital image without defects. In this way, advantageously, a certain tolerance is introduced in deciding whether a pixel of the image under analysis belongs or not to the pattern, for example to take account of possible variations/deformation/drifts of the pattern sections in said image under analysis.

Preferably, comparing said third index with said second index comprises calculating the angular difference between the at least local orientation of the structure section passing through the pixel and the at least local orientation of the corresponding pattern section in the pattern model passing through the pixel. Preferably, the pixel is determined to belong to a possible defect if the angular difference exceeds, in absolute value, 5°, more preferably 10°, even more preferably 15°. A certain tolerance on the calculated difference is thereby advantageously introduced.

Typically, said sections representative of said linear elements of the pattern are rectilinear segments, more typically interconnected to form a network of polygons.

Preferably, said surface portion is a circumferential inner surface portion, more preferably corresponding to an angle in the centre that is greater than or equal to 30°, more preferably greater than or equal to 60°, typically equal to at least one round angle.

Preferably, said circumferential inner surface portion has a width in a plane passing by said axis, greater than or equal to 50 mm, more preferably greater than or equal to 80 mm, and/or smaller than or equal to 200 mm, more preferably smaller than or equal to 150 mm. Preferably, the method is repeated by varying each time said circumferential inner surface portion so that all the surface portions make up at least one whole inner surface half-portion that extends from the median plane to a bead.

Preferably, the method comprises carrying out the analysis described above while keeping the tyre resting on one of the sidewalls. Preferably, the method comprises tilting the tyre so as to rest it on an opposite sidewall and repeating the operations described above.

According to a second aspect thereof, the invention relates to an apparatus for analysing tyres in a tyre production line.

The apparatus comprises:
  a support for a tyre, preferably horizontal and preferably adapted to rotate around an axis perpendicular thereto;
  at least one source adapted to emit at least one light radiation for illuminating a surface portion of the tyre, when set on the support, and, at a distance from said source, a detection system adapted to detect an optical intensity of the light radiation reflected and/or diffused by said surface portion; and
  a processing unit configured for actuating the method according to the first aspect of the present invention.

Preferably, the detection system comprises a linear camera having an objective line lying on an optical plane passing by the linear camera.

Preferably, said at least one source includes a first light source, a second light source and a third light source adapted to emit a first, a second and a third light radiation, respectively, for illuminating said surface portion, more preferably a linear surface portion coincident with or near the objective line.

Preferably, said first light source and second light source lie on opposite sides, respectively, with respect to said optical plane.

Preferably, each of said first and second light source is adapted to illuminate said objective line with a respective grazing light, and said third light source is adapted to illuminate said objective line with diffuse light.

In one embodiment, the detection system comprises a mirror having a reflective surface arranged at the third light source perpendicular to the optical plane and intersecting the latter (typically on the median line of the mirror) in a manner so as to reflect said objective line in the optical plane by an angle greater than or equal to 30° or smaller than or equal to 135°. In this way, advantageously, during the inspection of the inner surface of the tyre, the linear camera remains positioned in the central area of the tyre while the group with the light sources works close to the inner surface.

Preferably, the apparatus comprises a command and control unit configured for:
  activating, in alternating sequence, said first light source, second light source and third light source; and
  driving said linear camera for respectively acquiring said first, second and third image synchronously with the activation of said first light source, second light source and third light source, respectively. In this way, it is possible to acquire both an image in diffuse light and two images in grazing light.

Preferably, the apparatus includes a movement member adapted to rotate said support, about an axis of rotation thereof, the command and control unit being configured for controlling said movement member.

BRIEF DESCRIPTION OF THE DRAWINGS

Further features and advantages will become more apparent from the detailed description of some exemplary but non-limiting embodiments of a method and an apparatus for analysing tyres in a tyre production line, according to the present invention. Such description will be given hereinafter with reference to the accompanying figures, provided only for illustrative and, therefore, non-limiting purposes, in which:

FIG. 15 shows a flow chart of the method of the present invention.

DETAILED DESCRIPTION OF THE INVENTION

Figure 1:
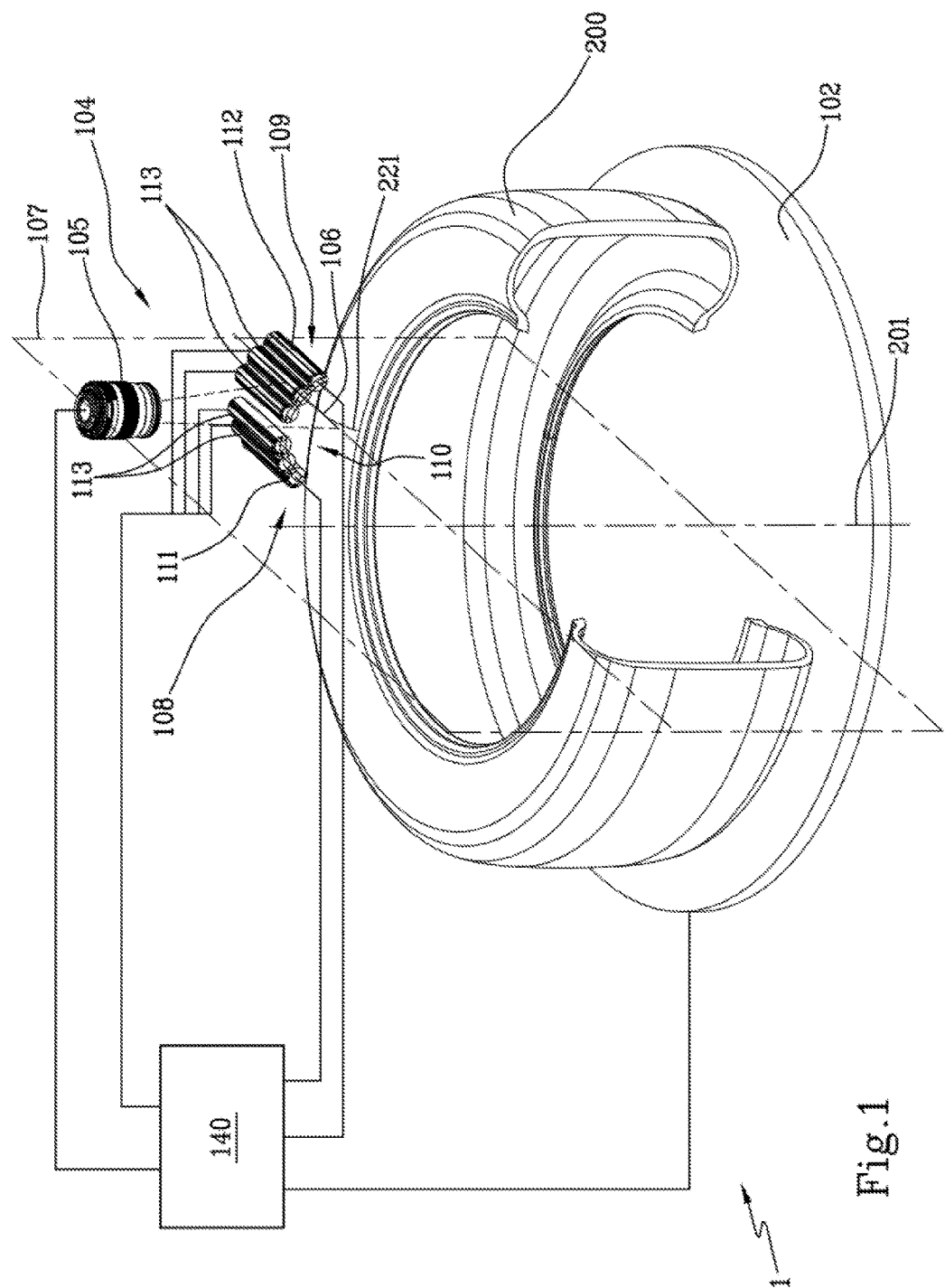
FIG. 1 shows a schematic diagram, in terms of functional blocks, of an apparatus for analysing the surface of tyres according to the present invention.

With reference to the figures, reference numeral 1 generally indicates an apparatus for analysing a surface of tyres in a tyre production line according to the present invention.

Apparatus 1 comprises a support 102 adapted to support tyre 200 on a sidewall and to rotate the same about an axis of rotation 201 coinciding with the axis of rotation of the tyre and typically arranged according to the vertical. Support 102 is typically operated by a driving member, not further described and shown, since it may exemplarily be of known type.

Apparatus 1 comprises a source 104 adapted to emit at least one light radiation for illuminating a surface portion of the tyre set on the support, and, at a distance from said source, a detection system 105 adapted to detect an optical intensity of the light radiation reflected and/or diffused by the surface portion.

The detection system 105 comprises a camera, preferably linear and having an objective line 106 lying on an optical plane 107 passing by the linear camera and the axis of rotation 201.

Source 104 comprises a first light source 108, a second light source 109 and a third light source 110 adapted to emit a first, a second and a third light radiation, respectively, for illuminating a linear surface portion 211 of said tyre coinciding with the objective line (for example, when the surface portion is planar) or in the vicinity of the objective line (due to the curvilinear trend of the tyre surface).

The detection system 105 is adapted to acquire a respective two-dimensional digital image of the linear surface portion of the surface illuminated by at least one of the first, second and third light radiation.

Typically, the apparatus comprises a robotic arm (not shown) on which the first, second and third light source and the detection system are mounted.

Preferably, the first light source 108 and the second light source 109 consist each of a single respective sub-source 111 and 112. Preferably, the third light source 110 consists of four respective sub-sources 113 distributed on both sides of the optical plane 107 and symmetrically with respect to such plane.

Each sub-source 111-113 has a respective main direction of development which develops parallel to the optical plane 107 and thus to the objective line 106.

Each sub-source typically comprises a plurality of LED light sources arranged aligned along the main direction of development.

Figure 2:
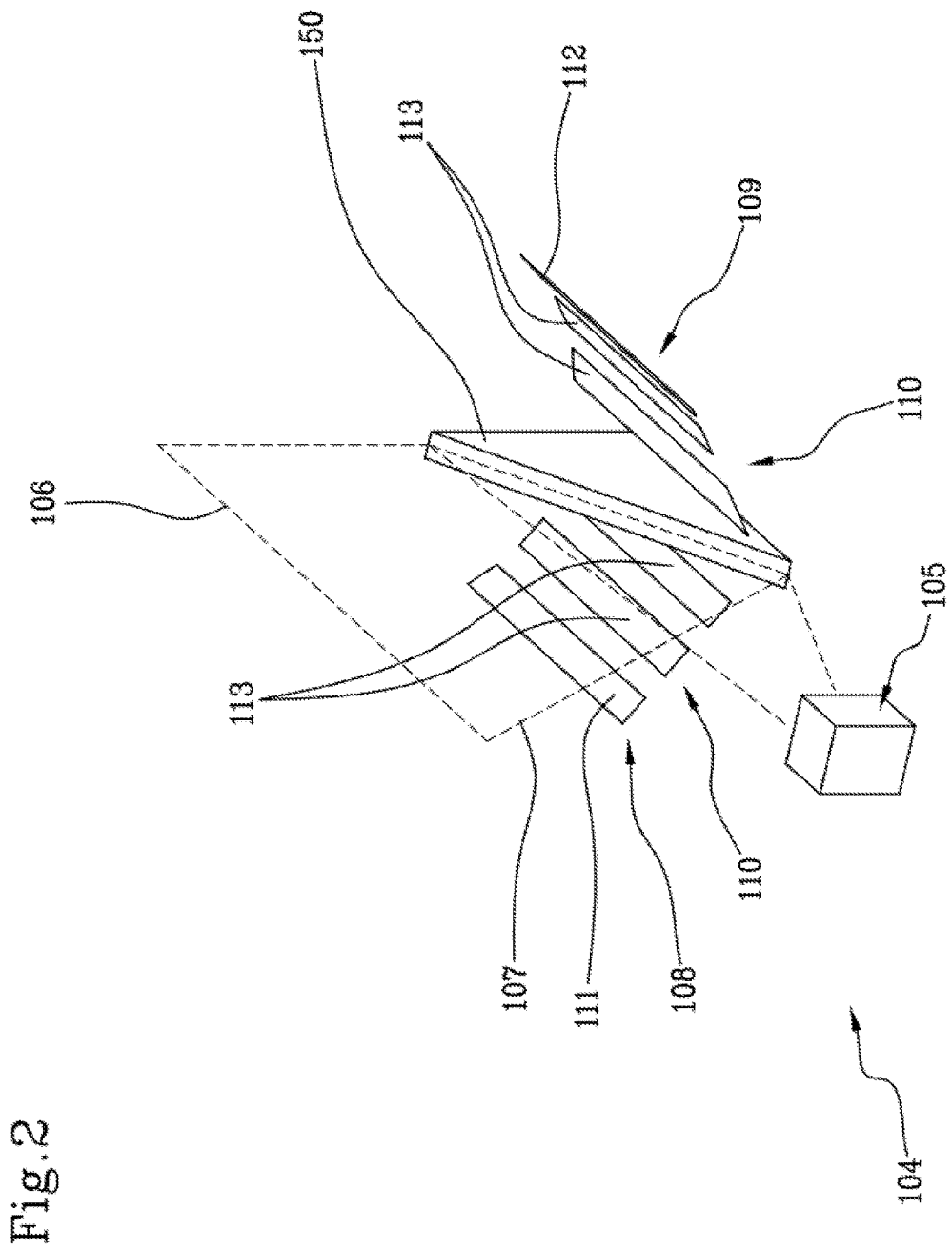
FIG. 2 shows a schematic view of a part of the apparatus according to the present invention according to an embodiment variant.

In FIG. 2, the light sub-sources are schematically shown with reference to their respective emitting surface (exemplarily of rectangular shape), which may for example coincide with a transparent protective and/or diffuser glass. Exemplarily, the sub-sources have a dimension along the main direction of development equal to 6 cm and a dimension along the direction orthogonal to the main direction of development equal to about 1 cm.

Preferably, the sub-sources 111 and 112 lie on opposite sides, respectively, with respect to the optical plane and are equidistant therefrom.

Preferably, the distance of the sub-sources 113 of the third light source from the optical plane 107 is smaller than the distance between each sub-source of said first light source and second light source and the optical plane.

Preferably, the third light source 110 is adapted to illuminate the objective line with diffused light (for example a respective angle having its vertex in each point of the objective line and lying in a plane orthogonal to the objective line, and subtended by the third light source, is equal to about 80°).

In an embodiment of the apparatus particularly adapted for the inspection of the inner surface of the tyre, exemplarily shown in FIG. 2, the detection system includes a mirror 150 (typically also mounted on the robotic arm) having a flat reflective surface arranged at the third light source perpendicularly to the optical plane and intersecting the latter on the median line of the mirror, so as to reflect the objective line in the optical plane by an angle exemplarily equal to 90°.

Preferably, a command and control unit 140 is comprised, configured to activate in an alternating sequence the first, second and third light source, and control the linear camera for acquiring a first, second and third image, respectively, in synchronization with the activation of the first, second and third light source, respectively.

The command and control unit is typically configured to also control the handling member of support 102.

The apparatus comprises a processing unit (for example integrated in the command and control unit 140 or in communication therewith or with the detection system 105 for receiving said acquired images) configured for implementing the method according to the present invention.

In operation, a tyre 200 is placed on support 102 and subjected to a (preferably full) rotation around its axis of symmetry 201 in order to detect a two-dimensional digital image of an inner surface portion, preferably along the whole circumferential development.

During the rotation, the command and control unit cyclically activates, in rapid alternating sequence, said first, second and third light source and activates the linear camera to acquire a respective two-dimensional linear digital image (colour or monochrome) of the respective linear surface portion in synchrony with the activation of the first, second and third light source, respectively. By way of example, every single linear digital image comprises 1×2048 pixels in the case of monochrome camera, or 2×2048 pixels in the case of RGB colour or bilinear camera.

By way of example, the time-lag between the acquisition of the first and second linear image, as well as between the second and third linear image and then cyclically between the first and third linear image, is less than 0.2 milliseconds.

Once the desired rotation of the tyre to scan the desired surface portion has been carried out, preferably at least one full rotation in order to acquire all the circular development, a unique digital image is obtained, made with all the linear digital images of the sequence of linear portions, each illuminated with the three light sources.

The processing unit receives such image from the detection system and separates therefrom the corresponding first, second and third image of the entire desired surface portion.

Such images can be substantially superimposed, pixel by pixel, although the real linear surface portion associated with a single linear image does not exactly corresponds to the three images, due to the rotation of the tyre occurred meanwhile. However, the selection of the acquisition frequency of the linear images and of the speed of rotation is such that the three linear images are mutually interlaced and thus comparable pixel by pixel.

Figure 3:
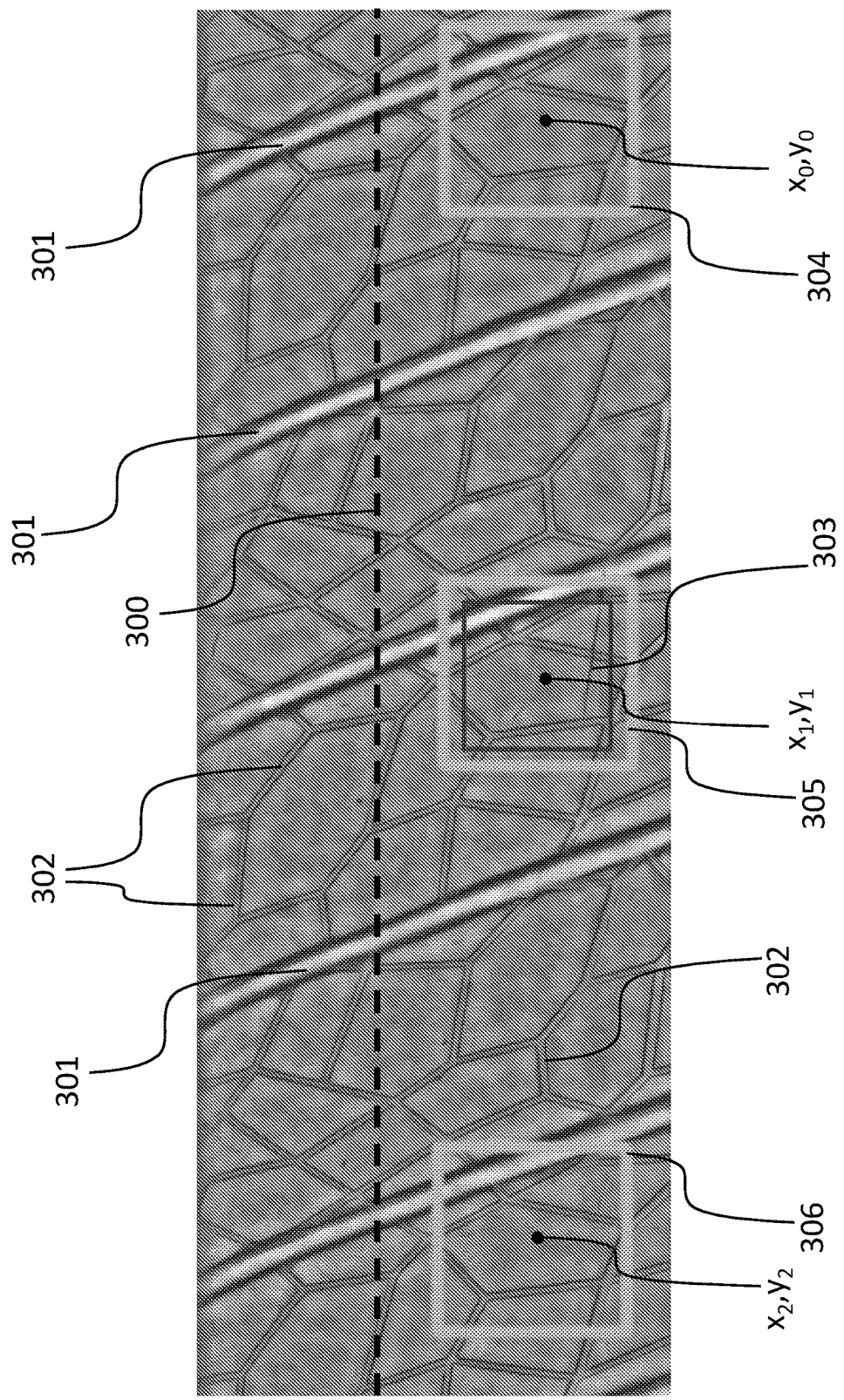
FIGS. 3-14 show some steps of the method using a visual representation of respective digital images.

FIG. 3 shows an exemplary visual representation in grey scale of an example of said first image, that is, of a two-dimensional digital image, acquired in the visible frequency range, of an inner surface portion of a tyre illuminated with diffused light (totally similar to a common black and white picture). The circumferential direction of the tyre is arranged along the horizontal direction in the figure (straight line 300).

In the example in FIG. 3, each pixel of the digital image is associated with a scalar value (grey level or scale) in a scale of 255 levels directly representative of the reflectivity and/or diffusivity and/or colour of the inner surface point corresponding to the pixel considered. The present invention may also be applied to digital images in which each pixel is associated with a vector value, such as digital colour images. For example, the method described herein may be carried out on each channel/colour or combinations thereof, or on a selected channel (e.g. green, which advantageously provides a better image quality).

The digital image on which the method described herein is carried out may coincide with the digital image directly detected by the detection system or, more preferably, may be subjected, before carrying out the method described herein, to a pre-processing to improve the quality thereof. Said pre-processing may comprise one or more of filtering, balancing, noise reductions, smoothing, for example as known in the art. Hereinafter it is assumed that such pre-processing does not change the two-dimensional digital nature of the image, such that each pixel is associated with a luminosity (or tone) value representative of the reflectivity and/or diffusivity and/or colour of the inner surface.

As seen in FIG. 3, the inner surface of the tyre is grooved by a plurality of reliefs that form a "pattern." The presence of the reliefs produces a variation in the reflectivity of the inner surface detected by the camera. The present invention is also applicable to low relief or simply two-dimensional patterns, i.e. consisting only in a variation of colour and/or reflectivity and devoid of depth. Typically, the pattern comprises a series of rectilinear sections 301 substantially mutually parallel, typically distributed with substantial periodicity along the circumferential direction, and a dense network (in the jargon called 'pebble edge') of substantially rectilinear segments 302 interconnected in a substantially continuous network, the pattern being typically characterised by a substantial periodicity thereof along the circumferential direction. It is noted that the pattern develops on the inner surface of the tyre, which is provided with its own curvature.

Preferably, the pattern consists of closed broken lines (polygons) connected to each other. Typically, the pattern consists of polygons adjacent to each other (e.g. is devoid of isolated polygons).

The pattern has a scheme that is repeated substantially equal thereto in a plurality of positions distributed along the circumferential direction, typically with a substantial circumferential periodicity (for example with a local period variation, in absolute value, falling within 5% of the average period calculated on the whole image), even more typically with continuity along the whole digital image. In the example shown, the pebble edge has a circumferential periodicity equal to twice the periodicity of the rifling, whereby the overall periodicity of the pattern is equal to that of the pebble edge.

As stated said above, reliefs 301, 302 are the imprint left by the pneumatic bladder. In practice, said scheme is typically repeated along the circumferential direction with slight variations in the periodicity and/or shape and/or orientation and/or axial position, while remaining substantially equal, such variations being due for example to the non-uniformity of the bladder expansion and/or positioning, and/or to small distortions of the pattern imprinted on the bladder itself, and/or to phenomena of distortion in the image detection process (for example, due to faulty centring of the axis of rotation of the tyre, non-perfect circularity of the tyre, etc.).

For more clarity, FIG. 3 shows a circumferential digital image portion long, along direction 300, only two and a half times around the period of the pattern; however, typically the processed digital image corresponds to a circumferential inner surface portion comprising said scheme repeated at least eight-ten times. Preferably, the circumferential inner surface portion processed covers the entire circumferential inner development of the tyre.

Typically, the processed digital image corresponds to a portion of the inner surface having a length in the axial direction (the direction perpendicular to direction 300 in FIG. 3) of at least 5 cm, preferably equal to at least half of the overall axial development of the tyre crown.

FIG. 3 is shown an exemplary defect 303 (shown enlarged in FIG. 3a which shows a rotated detail of FIG. 3) consisting in a cut that crosses at least one segment of the pattern.

Preferably, the method provides for deriving a value representative of the pattern period through digital image processing, for example by seeking a maximum of an autocorrelation function (for example, the Pearson correlation coefficient calculated on the values associated with the pixels of the image) between a given portion (in the jargon called 'support') of the digital image (having adequate dimensions, for example circumferential length greater than the period and smaller than three times the period) and a plurality of further portions of the digital image having dimensions equal the to the dimensions of said given image portion and arranged in circumferentially distributed positions. Preferably, the circumferential autocorrelation is repeatedly calculated with reference to multiple different supports and partially overlapping in the axial direction of the image, and having the same dimensions, with the aim of selecting the most reliable autocorrelation peak to identify the pattern period. Alternatively, it is provided to acquire a predetermined value of the period, for example from a measurement and/or from the specifications of the bladder.

The method involves identifying a first region 304 of the digital image corresponding to a sub-portion of the scheme, for example having a smaller circumferential development than an entire circumferential development of the scheme (in the example equal to about one third of the circumferential development of the scheme, coinciding with said period). The dimensions of the first region are advantageously consistent with the typical expected dimensions of the defect sought.

It is further provided to identify a respective plurality of regions 305, 306 of the digital image homologous to the first region 304 and distributed along the circumferential direction. Each homologous region contains a respective scheme sub-portion substantially identical to the scheme sub-portion of the first region. To this end, a correlation function is calculated (for example, the Pearson correlation coefficient) between the first region and a portion of the rest of the digital image. Preferably, a first homologous region 305 is first identified by calculating the correlation function between the first region 304 and a plurality of regions having dimensions equal to the first region and arranged in a neighbourhood of a point of the digital image that is circumferentially distant from the first region by a distance equal to a period P. For example, if the coordinates of the centre of the first region 304 are $x_0$, $y_0$, a region of equal dimensions is first identified, having the coordinates $x_0$, $y_0+P$ at the centre. Then, the correlation function is calculated between the first region and all the regions of the same dimensions whose centre is located in the neighbourhood of coordinates $x_0 \pm \Delta x$, $y_0+P \pm \Delta y$, with $\Delta x$, $\Delta y$ equal to an appropriate number of pixels, for example 5-10 pixels. The region having coordinates $x_1$, $y_1$ at the centre, at which the correlation function exhibits a maximum (at least local), is identified as the first homologous region 305.

The algorithm is repeated starting from the first homologous region 305 and seeking a correlation maximum in the neighbourhood of coordinates $x_1 \pm \Delta x$, $y_1+P \pm \Delta y$, in order to locate the second homologous region 306 (having at the centre coordinates $x_2$, $y_2$), and so on iteratively, so as to identify a sequence of homologous regions in succession. In particular, a tuple of coordinates $x_n$, $y_n$ is calculated, corresponding to the centre (or any other reference point) of the tuple of homologous regions.

In the example described herein, the acquisition of the value representative of the pattern period by processing the digital image and identifying such tuple of coordinates are performed on the image in diffuse light (of the type shown in FIG. 3).

However, the Applicant has verified that even more robust results can be obtained if the calculation operations of the period and/or identification of such tuple (for example the identification of homologous regions through autocorrelation) are carried out on a difference image, in which each pixel is associated with a value representative of the difference of the corresponding luminosity values of the second and third images acquired in grazing light, as described above.

This tuple of coordinates is then shown on the first image in diffuse light in order to identify a corresponding first region and a corresponding plurality of homologous regions in said first image.

It is further provided to calculate a model of the scheme sub-portion, in which each pixel is associated with a mean value of the values associated with the pixels of the first region and of the respective homologous regions of the first image having the same coordinates of said each pixel.

Figure 4:
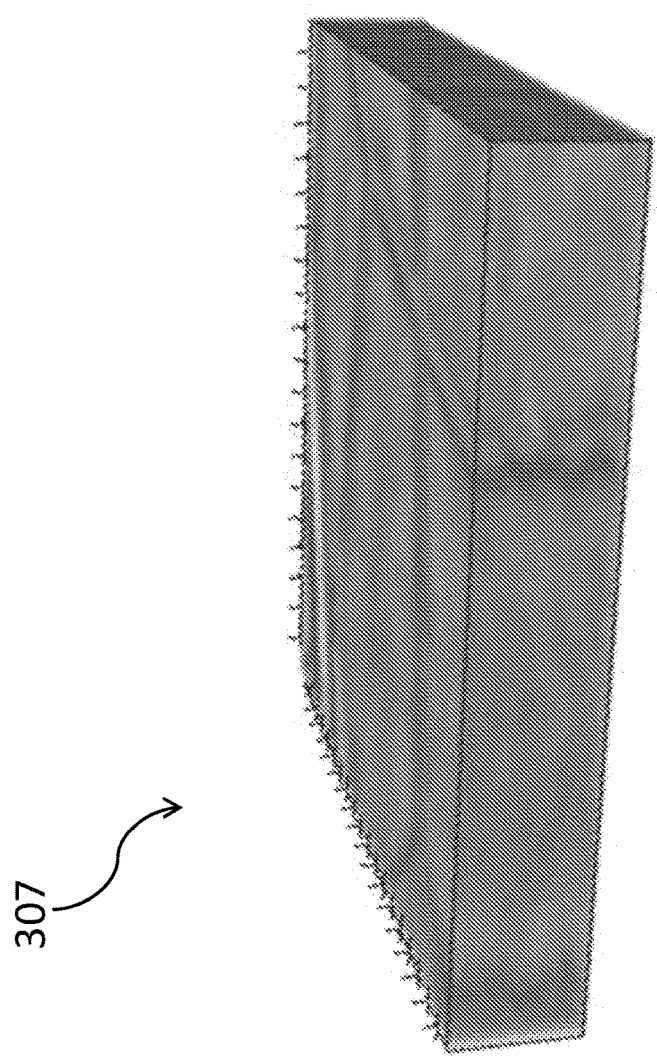

To this end, for illustration purposes, FIG. 4 shows a 3D graphical representation of a stack 307 of regions obtained by overlapping of the first region (for example at the base of the stack) and all its respective homologous regions of the first image in diffuse light. As can be seen, each pixel at the base of the stack corresponds to a set of statistical values (scalar, or grey scale) lying on the corresponding vertical column. Such statistical set has an intrinsic variance due to the deformations described above.

Figure 5:
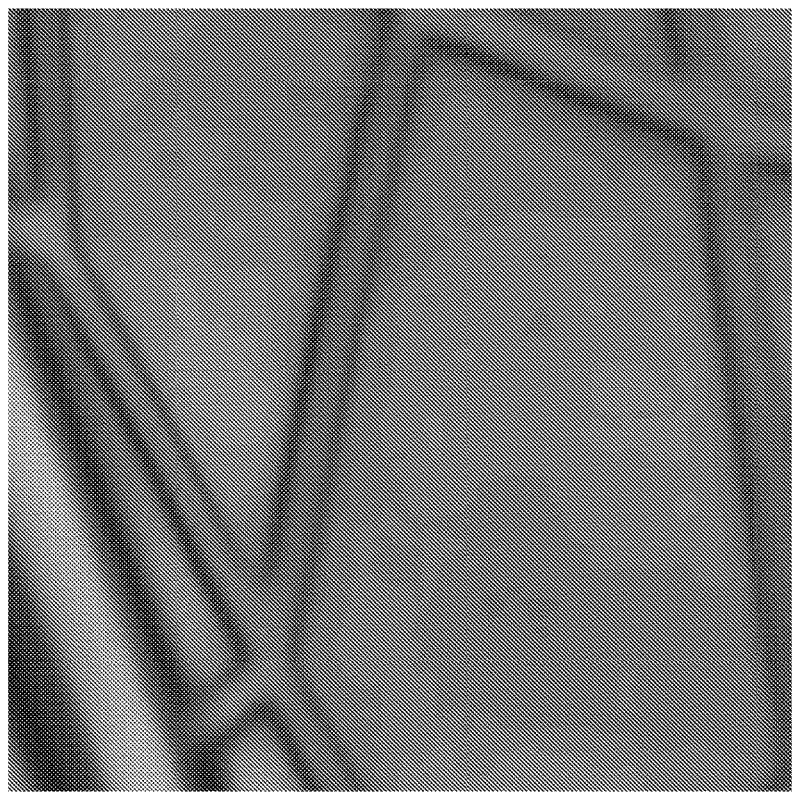

Preferably, the digital model 308 of the scheme sub-portion (shown in FIG. 5) associated with the first region 304 is calculated considering the median value of the corresponding statistical set for each pixel of the base of the stack. A model 308 is thus generated which has in each relative coordinate pixel (i,j) the median value (e.g. grey level) calculated on all of the relative coordinate pixels (i,j) of the set of the first region and of the homologous regions. As can be seen in FIG. 5, the model thus calculated does not contain contributions from any defects, in addition to exhibiting a high image quality (e.g. in terms of noise and/or sharpness).

Preferably, a digital model of the respective scheme sub-portion is calculated according to the above for a plurality of first regions, each comprising the respective scheme sub-portion. The first regions form a connected digital image portion having circumferential development about equal to the period. In this way, a digital model is calculated for the whole scheme that makes up the pattern. Preferably, the first regions are mutually partially overlapping in the axial direction and/or in the circumferential direction, in order to improve the reliability of the method.

Once the models of respective sub-portions have been constructed, a pattern model is obtained by replacing, in said first image, said model of the respective scheme sub-portion to each first region and to the respective homologous regions. By the above self-learning procedure, an image is obtained that is a global model of the surface portion without defects, that is easily comparable with the actual image.

For the purpose of this comparison, it is advantageous to use the gradient modulus and orientation as described hereinafter.

In one embodiment, for each pixel of the pattern model in luminosity values calculated on the first image, it is contemplated to calculate a modulus value and an orientation value of a gradient of the luminosity values associated with the pixels, thereby obtaining a pattern model in gradient modulus values and in gradient orientation values, respectively. In order to reduce the use of computing resources, it is preferable to calculate these gradient modulus and gradient orientation values on each scheme sub-portion model in luminosity values, and then proceed with the above operation of obtaining a pattern model by replacement.

In an alternative and preferred embodiment, the operations described above for the identification of homologous regions and the calculation of a respective scheme sub-portion model (preferably by the use of a tuple of coordinates identified on the difference image) are conducted on the gradient modulus values and on the gradient orientation values calculated on the first image in luminosity values. In this case, it is not strictly necessary to calculate the pattern model in luminosity values on the first image.

For the purposes of calculating the gradient modulus and orientation values, the gradient of the luminosity values is calculated for each digital image pixel along the two horizontal and vertical coordinates of the image, thus obtaining a vector with two components: a modulus (e.g. the root of the quadratic sum of the two components) and an orientation in the digital image (e.g. the angle formed by the vector with respect to the horizontal direction), normalized in the range [0-180°] or [−90°-+90°].

In order to calculate the gradient modulus and orientation values, it is for example to proceed as follows: being I(x,y) each pixel of the input image (the notation (x,y) is omitted when unnecessary), the following is calculated:

Ix=I*Kx, where '*' is the convolution operator, and Kx is an appropriate kernel for the calculation of the first derivative in x (e.g. Kx=[1 −1])

Iy=I*Ky, where '*' is the convolution operator, and Ky is an appropriate kernel for the calculation of the first derivative in y (e.g. Ky=[1; −1])

Grad(x,y)=[Ix, Iy]=gradient of I(x,y)
gradient module=sqrt((Ix)^2+(Iy)^2)
gradient orientation=arctan(Iy/Ix)

Figure 6:
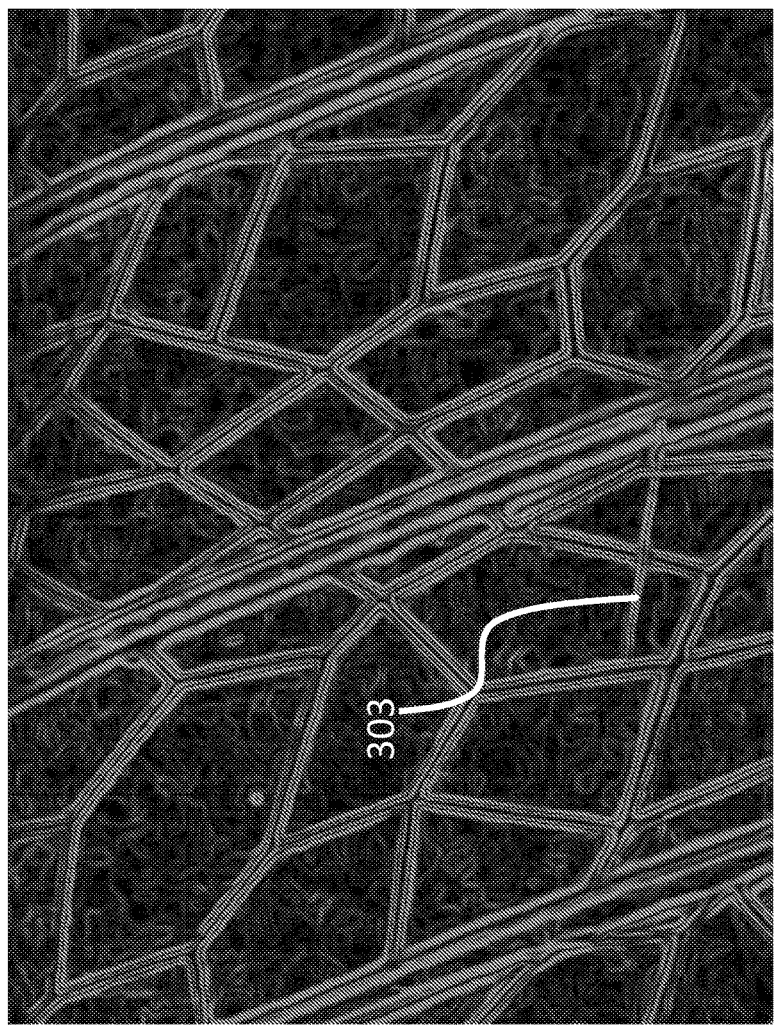

FIG. 6 shows an exemplary visualization of a surface sub-portion corresponding to a central portion of the image in FIG. 3, in which each pixel is associated with a grey level representative of (e.g. proportional to) the gradient modulus in the considered pixel (e.g. light pixels correspond to a high gradient modulus and vice versa).

Figure 7:
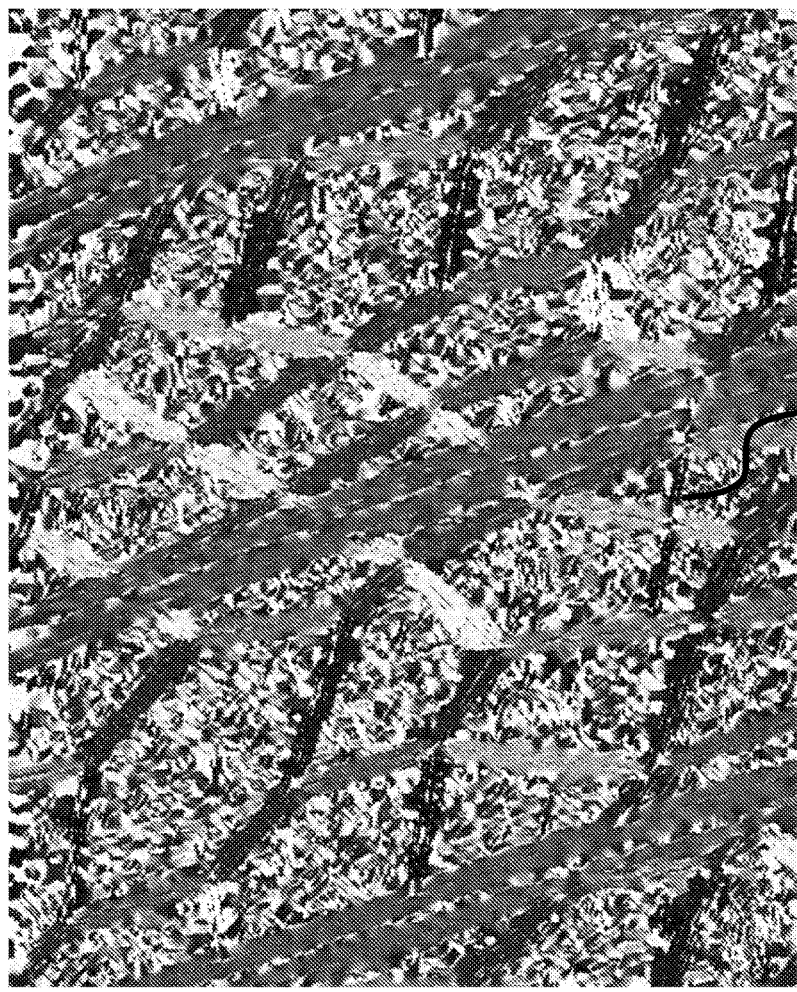

FIG. 7 shows an exemplary visualization of the same surface sub-portion in FIG. 6, in which each pixel is associated with a grey level uniquely representative of the gradient orientation in the pixel considered.

A comparison between FIGS. 6 and 7 shows that the low gradient modulus zones out of the pattern are characterized by a non-significant orientation value (variable disorderly).

As said above, by executing the following operations on the digital images as shown in FIGS. 6 and 7: identifying a plurality of first regions; for each first region, identifying a respective plurality of homologous regions; and calculating a respective model, the pattern model is obtained in gradient modulus values and gradient orientation values, respectively.

At this point, the resulting pattern model (be it in luminosity values and/or modulus values and/or gradient orientation values) is subjected to dilation to introduce a tolerance that takes account of the deformations and/or drifts of the scheme in the pattern.

In a first preferred embodiment, the pattern model in gradient modulus values is first binarised (for example by thresholding with a single or double threshold) to obtain a binary model of the pattern.

Such binary model of the pattern is subjected to dilation (for example by means of a morphological processing operation) in order to obtain a dilated pattern binary model in which the pixels have an associated first binary index, the value of which is indicative of whether the pixel belongs or not to the dilated patterns, respectively (in order to distinguish the pixels belonging to the background from those belonging to the dilated pattern the first image by comparison with such a dilated binary model).

Moreover, also the gradient orientation values of the pattern model are preferably subjected to dilation. Preferably, each pixel of the dilated pattern binary model belonging to the dilated pattern is associated with a second index, the value of which is representative of the orientation of the dilated pattern section passing by the pixel: for example, the gradient orientation value of the pixel having maximum gradient modulus value in a predetermined neighbourhood (for example equal to 5-10 pixels of radius) of said each pixel in said pattern model may be selected.

In a second alternative embodiment, the gradient modulus values and the gradient orientation values of the pattern model are first both subjected to dilation. For example, each pixel of the dilated pattern model is assigned as gradient modulus value the maximum value of the gradient module in a predetermined neighbourhood of said pixel in the pattern model (said neighbourhood exemplarily having a radius equal to 5-10 pixels) and as gradient orientation value that associated with the pixel having said maximum gradient modulus value. Subsequently, the pattern model thus obtained is binarised based on the gradient modulus value, thereby obtaining the value of said first index.

Figure 8:
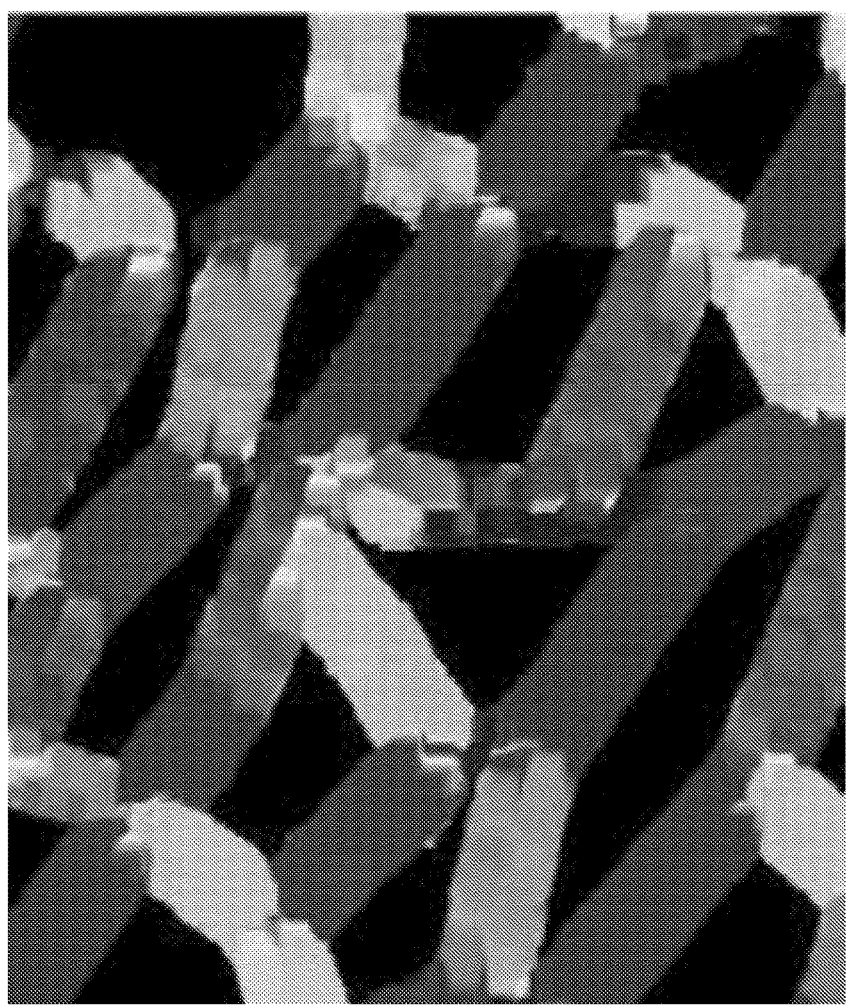

FIG. 8 shows an example of pattern model obtained as a result of said operations in the two embodiments. Each pixel of the image in FIG. 8 not belonging to the dilated pattern but to the pattern background (for example having value of said first index equal to zero) is shown in black. Each pixel belonging to the dilated pattern (for example having value of said first index equal to one) is shown in a grey level other than black, where each grey level biuniquely corresponds to a value of the second index representative of the orientation of the corresponding segment of the dilated pattern passing by the considered pixel. As can be seen, the pixels outside the dilated pattern (black pixels) do not have an associated significant value of the second index.

Before making the comparison between the first image of the tyre acquired in diffuse light into luminosity values and the dilated pattern model as obtained above, it is advantageous to process such first image in order to highlight the potential defects of the rest of the image.

To support the description of the method for highlighting potential defects, reference will be made to FIGS. 9-12.

Figure 3A:
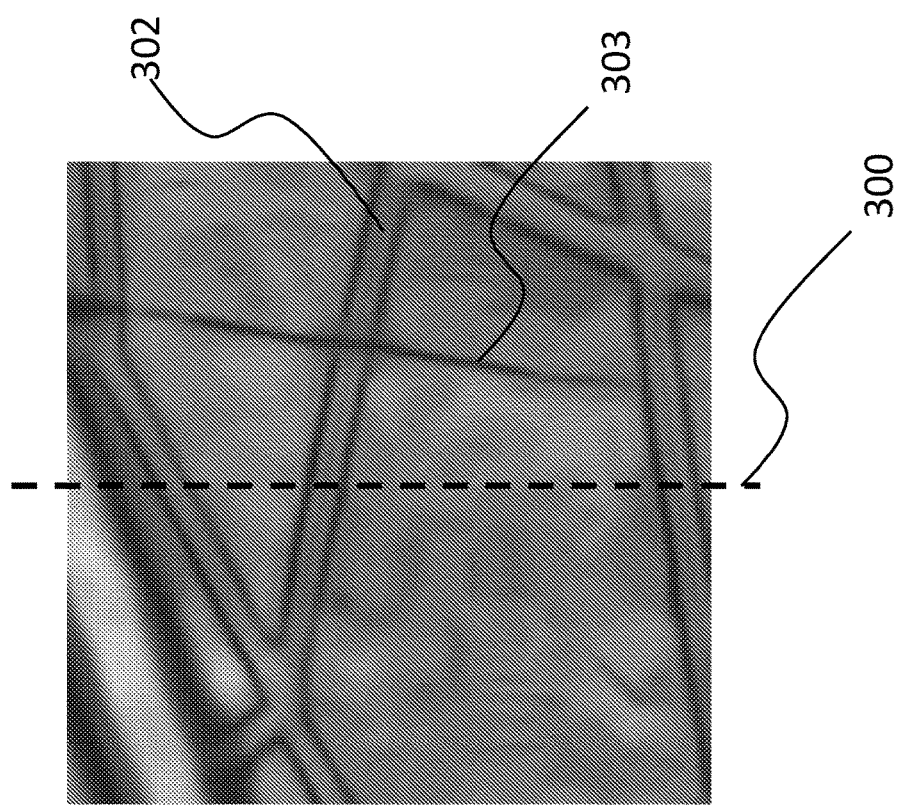
Figure 9:
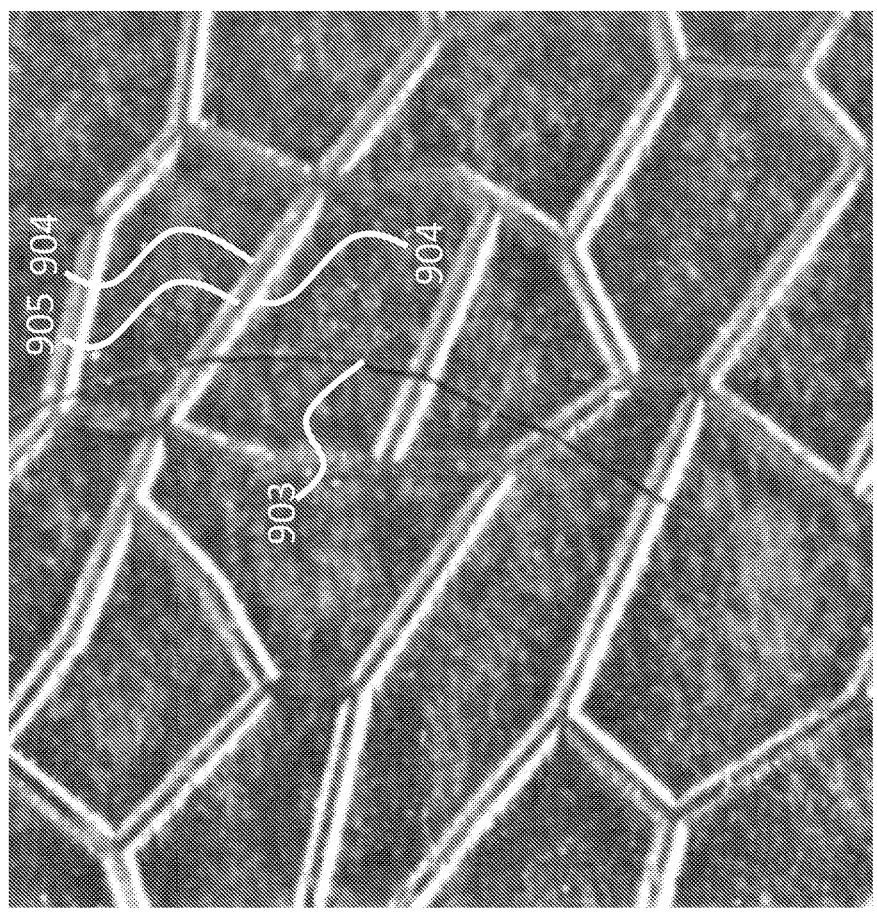

FIG. 9 exemplarily shows a visual representation in greyscale of a further example of a portion of the first image, of a similar nature to that shown in FIGS. 3 and 3a, showing a further inner surface portion of a tyre illuminated with diffuse light, in which a defect 903 is present, consisting of a cut that crosses some segments of the pattern. On the surface portion in FIG. 9 there were traces of a release agent used in the bladder, in particular on the walls of the pattern segments. Since this release agent is highly reflective, such walls of the pattern segments in the image give rise to a pair of very bright parallel lines 904. A darker line 905 is present between the two bright lines which corresponds to the 'top' of the pattern segments, less dirty with release agent. In such a situation, in principle, segments 905 may be confused with cuts 903 as they have similar luminosity features.

In order to highlight the potential defects from the rest of the image, it is contemplated to calculate a value representative of the main eigenvalue (or maximum eigenvalue) of the Hessian matrix in said pixel for each pixel of the first image in luminosity values.

By way of example, the Hessian matrix is calculated as follows. Being, as above, I(x,y) each pixel of the input image, the following is calculated:

Ixx=I*Kxx, where '*' is the convolution operator, and Kxx is an appropriate kernel for the calculation of the second derivative in x (e.g. Kxx=[1 −2 1] row vector)

Iyy=I*Kyy, where '*' is the convolution operator, and Kyy is an appropriate kernel for the calculation of the second derivative in y (e.g. Kyy=[1; −2; 1] column vector)

Ixy=Iyx=I*Kxy where '*' is the convolution operator and Kxy is an appropriate kernel for the calculation of the mixed derivative (e.g. the matrix Kxy=[1 0 −1 0 0 0; −1 0 1] where "," is the line separator).

The Hessian H=[Ixx Ixy; Iyx Iyy] is thus obtained.

From the Hessian matrix H, the eigenvectors and the eigenvalues are calculated, for example by the algorithm EVD (Eigen Value/Vector Decomposition).

Preferably, the main eigenvalue values are binarised by comparison with a first threshold value, in order to identify the proposed defect pixel like those pixels whose maximum eigenvalue associated is above such first threshold value.

Figure 10:
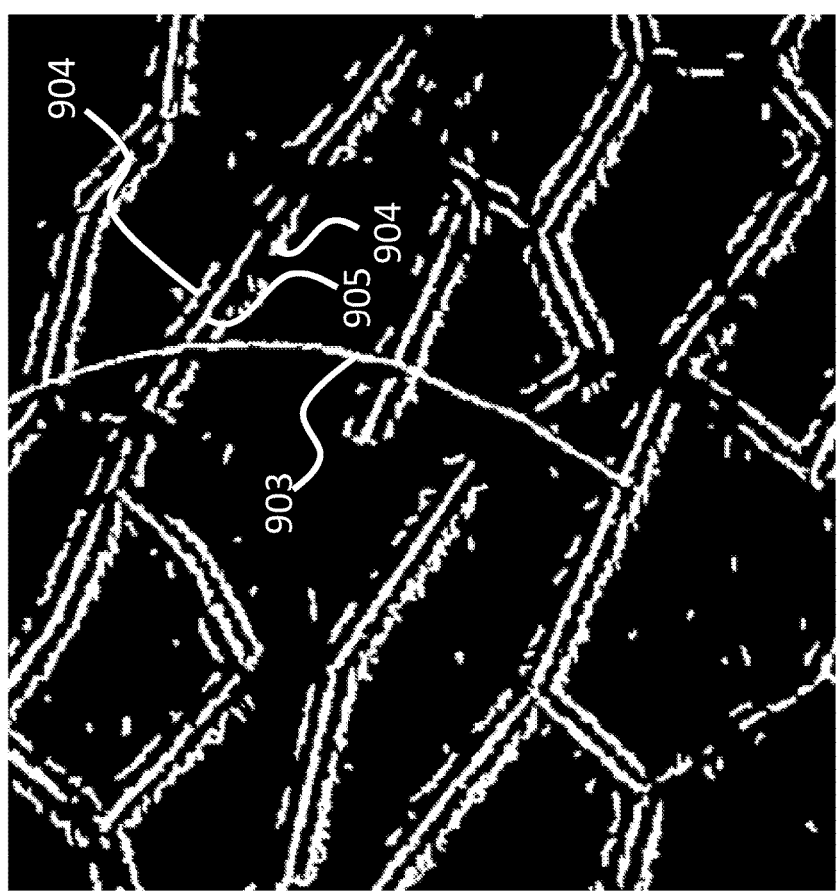

FIG. 10 shows an exemplary visualisation of the first image portion substantially corresponding to that shown in FIG. 9, binarised on the basis of the main eigenvalue. It is noted that said finalisation has enhanced both the pixels belonging to cut 903 and the pixels at walls 904 (more precisely of the transition areas between the pattern background and walls 904) and of the central areas 905 of the pattern segments 905 where the maximum eigenvalue is high.

In order to eliminate at least the pixels in the transition areas between the pattern background and the walls of the pattern segments from the proposed defects thus obtained, as well as other spurious pixel, it is contemplated to compare the gradient modulus values calculated on the luminosity values of the first image with a second threshold value and identify the pixels with a gradient modulus value smaller than such second threshold value as proposed defects.

Figure 11:

FIG. 11 substantially shows the same image portion in FIG. 9 wherein the pixels have been binarised on the basis of the gradient modulus (optionally with appropriate edge smoothing operations). The white pixels are those with low gradient modulus value, i.e. smaller than the second threshold value. It is noted that pixels 904 at the edges of the pattern segments have a high gradient value.

Figure 12:
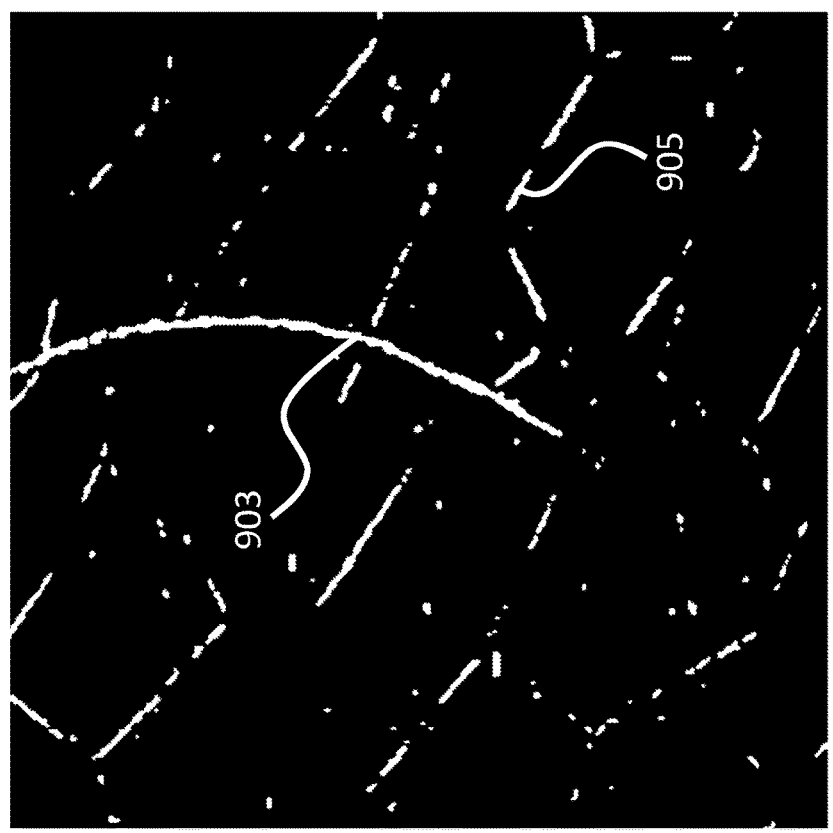

FIG. 12 substantially shows the same image portion in FIG. 10, where the white pixels are the proposed defects obtained from the concurrent thresholding with said two threshold values (i.e. the white pixels both in FIG. 10 and in FIG. 11). It is noted that some pixels 905 remain as proposed defects at the centre of some pattern sections, while almost all pixels at the edges of the pattern sections have been substantially filtered by the criterion. In order to further select the proposed defects, a third selection criterion is preferably provided, preferably used in combination with said two further criteria, based on the luminosity value in the image acquired in diffuse light. In particular, such luminosity value is compared with a third threshold value and all the proposed defect pixels as identified above are selected, which also have the luminosity value below the third threshold value.

At this point, it is possible to make the comparison between the proposed defect pixels thus selected with the dilated pattern model free from defects as calculated above, in order to detect any defects in the surface portion as a function of such comparison.

Preferably, a first set of pixels is identified among said proposed defect pixels for which the corresponding pixels in the dilated pattern model do not belong to the dilated pattern (for example with reference to FIG. 8, the black 'background' areas), to identify the defects (or defect portions) located outside the pattern, i.e. belonging to the pattern 'background'. Preferably, it is contemplated to identify a second set of pixels among said proposed defect pixels that have the corresponding pixel in the pattern model belonging to the pattern (for example the pixels in grey level other than black in FIG. 8), for which the at least local orientation of the pattern section passing by said dilated pattern model (represented by said second value, e.g. the orientation value of the dilated gradient) is significantly different (for example, the difference is greater than 20°) from the orientation of the section formed by said proposed defects and passing by said pixel. In that case, such proposed defect section passing by said pixel is probably a cut having a portion that intersects with a pattern section in said dilated pattern model.

In a first embodiment, the orientation of the section formed by said proposed defects and passing by said pixel is represented by the gradient orientation value in said pixel calculated as described above on the luminosity values in the first image in diffuse light.

In a second embodiment, the orientation of the section formed by said proposed defects and passing by said pixel is represented by the orientation of the main eigenvector of the Hessian matrix in said pixel calculated as described above on the luminosity values in the first image in diffuse light.

Figure 13:
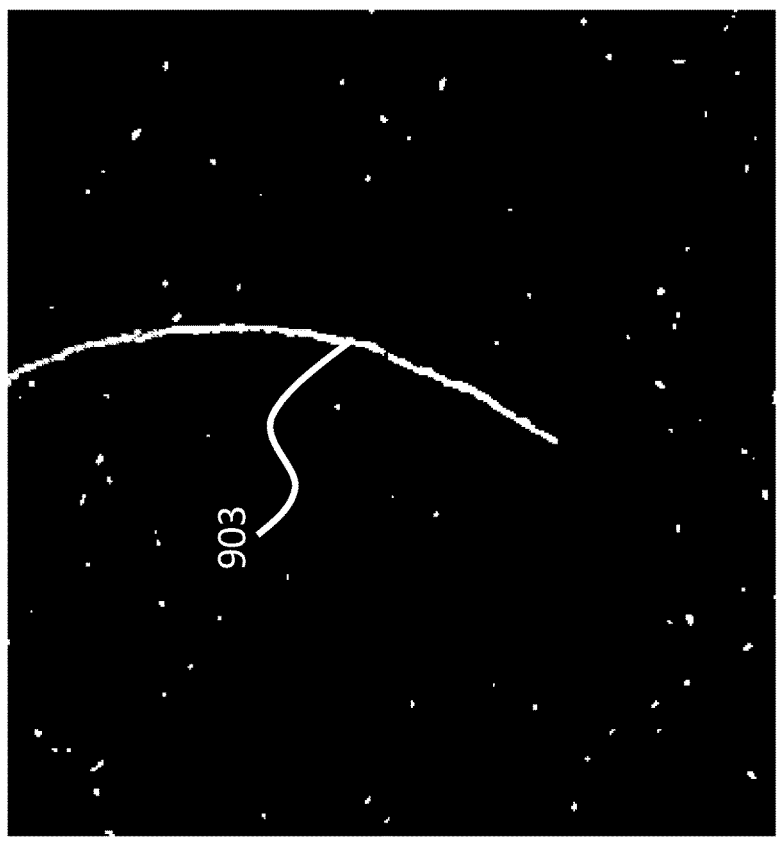

Preferably, it is contemplate to merge (in OR logic) the first and second set of pixels to form a final image (typically binary) representative of said surface portion wherein the pixels corresponding to said first and second set are distinct from the remaining pixels, as exemplarily shown in FIG. 13, where it is seen that both the cutting portion at the pattern background and the cut portion at the dilated pattern has been identified.

Figure 14:
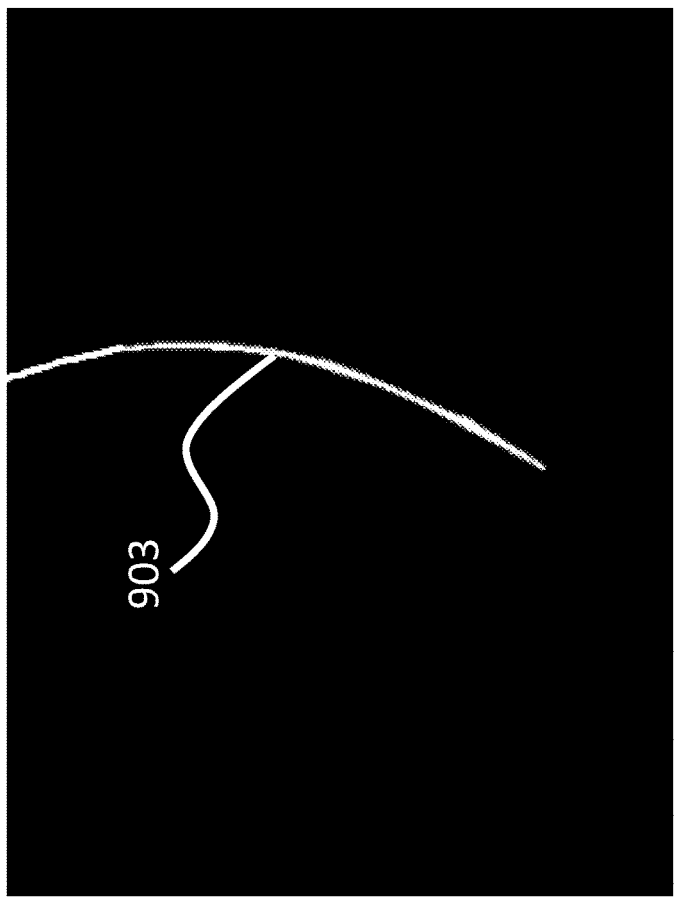

Preferably, appropriate morphological processing can be carried out on said pixels in order to discard false proposed defects. For example, the isolated pixels blocks or the connected pixel regions ('blob') that are not compatible with the defects sought are eliminated; in particular, the selection can be made by area and/or length. FIG. 14 shows the end result of a processing of this type carried out on the image in FIG. 13.

FIG. 15 shows a flowchart of the method of the present invention in which operation 1010 represents the operation of providing the tyre having a surface with a pattern with a set of linear elements.

Operation 1020 represents the operation of acquiring at least one digital image of a portion of the surface, said digital image comprising a structure comprising sections representative of said linear elements of the pattern in said surface portion and representative of possible elongated defects, said sections of said structure having, at least locally, a respective orientation.

Operation 1030 represents the operation of providing a digital model of the pattern in said surface portion, wherein each pixel is associated with a first index representative of whether the pixel belongs to a pattern section in said model and, for the pixels belonging to the pattern in said model, a second index representative of an at least local orientation of said pattern section in said model passing through said pixel.

Operation 1040 represents the operation of calculating, for each pixel of said structure, a third index representative of the orientation of the structure section passing through said pixel.

Operation 1050 represents the operation of comparing, for each pixel of the structure having a corresponding pixel in the pattern model belonging to the pattern, said third index with said second index associated with said corresponding pixel in the pattern model. Operation 1060 represents the operation of establishing whether said pixel of the structure belongs to a proposed defect on the basis of said comparison.

The invention claimed is:
1. A method for detecting one or more possible elongated defects on an inner or outer surface of a tyre, comprising:
    placing the tyre on a support, wherein the inner or outer surface of the tyre comprises a pattern of linear elements;
    subjecting, by a command and control unit, the tyre to a rotation around its axis of symmetry;
    providing to a processor a digital model of the pattern, wherein the digital model of the pattern comprises one or more pixels and one or more pattern sections, wherein each pixel of the digital model of the pattern is associated with a first index indicating whether the pixel belongs to the one or more pattern sections and wherein when the respective pixel belongs to the one or more pattern sections, the pixel is associated with a second index of an orientation of the one or more pattern sections;

acquiring, by a detection system, one or more digital images of the inner or outer surface, wherein the detection system comprises a camera, wherein the digital images comprise a structure comprising one or more structure sections corresponding to the linear elements and to the one or more possible elongated defects, wherein the structure comprises one or more pixels of the structure;

calculating, by the processor, for each pixel of the structure, a third index of an orientation of the structure sections to which the respective pixel belongs;

for each pixel of the structure having a corresponding pixel in the digital model of the pattern belonging to the one or more pattern sections of the digital model, comparing, by the processor, the third index with the second index; and establishing, by the processor, if the pixel of the structure belongs to the one or more structure sections corresponding to the one or more possible elongated defects based on the comparison.

2. The method as claimed in claim 1, wherein the first index is binary.

3. The method as claimed in claim 1, further comprising identifying, by the processor, a first set of pixels of the structure whose corresponding pixels in the digital model of the pattern do not belong to any pattern sections, and a second set of pixels of the structure consisting of the pixels of the structure belonging to the one or more structure sections corresponding to the one or more possible elongated defects.

4. The method as claimed in claim 3, further comprising creating a final image comprising one or more pixels of the inner or outer surface, wherein the pixels of the final image which correspond to the first and second set of pixels are discriminated from any remaining pixels of the final image.

5. The method as claimed in claim 1, wherein calculating the third index for each pixel of the structure comprises calculating a gradient in each of the pixels of the structure, wherein the gradient comprises a modulus and an orientation of the gradient in the digital images.

6. The method as claimed in claim 5, wherein the orientation of the gradient is an angle formed by the gradient with respect to a reference direction and wherein the third index is representative of the orientation of the gradient.

7. The method as claimed in claim 1, wherein calculating the third index for each pixel of the structure comprises calculating at least one eigenvector of a Hessian matrix in each pixel of the structure, the third index being an orientation of the at least one eigenvector.

8. The method as claimed in claim 7, wherein the at least one eigenvector is a principal eigenvector of the Hessian matrix.

9. The method as claimed in claim 1, wherein the digital model of the pattern contains a dilated pattern which is dilated with respect to the pattern in the inner or outer surface.

10. The method as claimed in claim 1, wherein comparing the third index with the second index comprises calculating an angular difference between the orientation of structure section and the orientation of the corresponding pattern section.

11. The method as claimed in claim 10, wherein the respective pixels of the structure are established to belong to the one or more structure sections corresponding to the possible elongated defects if the angular difference exceeds, in absolute value, 5°.

12. The method as claimed in claim 1, wherein the linear elements of the pattern are rectilinear segments interconnected to form a network of polygons.

13. The method as claimed in claim 1, wherein acquiring the digital images comprises acquiring a first digital image, wherein each pixel of the first digital image is associated to a luminosity value representative of reflectivity and/or diffusivity and/or colour of a surface point corresponding to each pixel of the first digital image, the surface point illuminated with diffused light.

* * * * *